United States Patent [19]

Wetton et al.

[11] 4,281,072
[45] * Jul. 28, 1981

[54] AMORPHOUS COMPLEXES OF POLYTHIOETHERS WITH SALTS

[75] Inventors: Raymond E. Wetton, Woodhouse Eaves; David B. James, Norwich, both of England

[73] Assignee: National Research Dev'p Corp., London, England

[*] Notice: The portion of the term of this patent subsequent to Apr. 29, 1997, has been disclaimed.

[21] Appl. No.: 84,376

[22] Filed: Oct. 12, 1979

Related U.S. Application Data

[63] Continuation of Ser. No. 828,607, Aug. 29, 1977, Pat. No. 4,200,701.

[30] Foreign Application Priority Data

Aug. 31, 1976 [GB] United Kingdom ............... 35990/76

[51] Int. Cl.$^3$ ....................... C08L 81/00; C08L 81/02
[52] U.S. Cl. ........................................ 525/4; 252/62.2; 219/10.55 D; 528/380; 528/381; 528/373
[58] Field of Search .................. 525/4; 252/62.2, 63.2; 528/44, 380, 381, 373; 219/10.55 D

[56] References Cited

U.S. PATENT DOCUMENTS

| | | | |
|---|---|---|---|
| 3,085,071 | 4/1963 | Bailey | 260/2 |
| 3,242,103 | 3/1966 | Velzmann | 260/2 |
| 3,274,129 | 9/1966 | Bailey | 260/2 |
| 3,375,207 | 3/1968 | Kaufman | 260/2 |

OTHER PUBLICATIONS

Wetton et al., Abstract of Talk, Canadian High Polymer Forum, Hamilton, Ontario, Aug. 21, 1975.
Moacanin et al., "Effect of Polar Forces on Viscoelastic Properties of Poly(Propylene Oxide)", J. Polym. Sci. c14, 313 (1966).
Fenton et al., "Complexes of Alkali Metal Ions with Poly(Ethylene Oxide)", Polymer 14, 589 (1973).
Wright, "Complexes of Poly(Ethylene Oxide)", Brit. Polym. J. 7, 319–327 (1975).
Wright, "Conduction Transition", J. Polym. Sci., Polym. Phys. Ed. 14, 955 (1976).
Lundberg, J. Polym. Sci. A1 4, 1563 (1966).
Blumberg et al. J. Polym. Sci. B4, 653 (1966).
Iwamoto et al., J. Polym. Sci. A-2, 6 1509–1525 (1968).
Cifferi et al., Die Makromol. Chem. 150, 265–270 (1971).
Dunn et al., J. Appl. Poly. Sci 13, 1641, 1657, 1673 (1969).
Dunn et al., J. Appl. Poly. Sci. 13, 1799 (1970).
Andrews, Second Internat'l Conf. on Yield, Deformation, and Fracture of Polymers, Cambridge, Mar. 26–29, 1973.
Szafner et al., Polymer, 16, 879–880 (1975).
Hannon et al., J. Polym. Sci., Polym. Phys. Ed. 13, 113–126 (1975).
Wissbrun et al., J. Polym. Sci., Polym. Phys. Ed. 13, 223–241 (1975).
Blumberg et al., "A Poly(Ethylene Oxide)–Mercuric Chloride Complex", J. Poly. Sci. A2, 2499–2502 (1964).
Yokoyama et al., Macromolecules 2, 184 (1969).

*Primary Examiner*—Earl A. Nielsen
*Attorney, Agent, or Firm*—Oblon, Fisher, Spivak, McClelland & Maier

[57] ABSTRACT

A polymeric material which comprises an amorphous solid solution formed between a metallic compound and a polymer by virtue of ether, thioether or urethane linkages contained therein, the metal of the metallic compound being selected from the group consisting of Be, Mg, Sr, Ba, Sc, Y, Ti, V, Cr, Mn, Fe, Co, Ni, Cu, Zn, Ga, Ge, Zr, Nb, Mo, Tc, Ru, Rh, Pd, Ag, Cd, In, Sn, Sb, Hf, Ta, W, Re, Os, Ir, Pt, Au, Hg, Tl, Pb, Bi, Al, La and the other lanthanides.

22 Claims, No Drawings

AMORPHOUS COMPLEXES OF POLYTHIOETHERS WITH SALTS

This is a continuation of application Ser. No. 828,607 filed Aug. 29, 1977 U.S. Pat. No. 4,200,701 issued Apr. 29, 1980.

This invention relates to materials possessing useful electrical properties and to electrical devices incorporating such materials.

The present materials are in general thermoplastic polymers and may be suitably shaped by conventional plastics processing techniques.

According to the present invention a polymeric material comprises an amorphous solid solution formed between a metallic compound and a polymer by virtue of ether, thioether or urethane linkages contained therein, the metal of the metallic compound being selected from the group consisting of Be, Mg, Sr, Ba, Sc, Y, Ti, V, Cr, Mn, Fe, Co, Ni, Cu, Zn, Ga, Ge, Zr, Nb, Mo, Tc, Ru, Rh, Pd, Ag, Cd, In, Sn, Sb, Hf, Ta, V, Re, Os, Ir, Pt, Au, Hg, Tl, Pb, Bi, Al, La and the other lanthanides. When the metal of the metallic compound is zinc, the non metallic moiety is preferably other than chlorine.

The ether, thioether or urethane linkages which may be present either in the polymer backbone or in pendant groups, or in both, usually amount to at least 5 mole % and preferably at least 10 mole % of the polymer and may represent up to 50 mole % thereof. The polymer may be a homo-polymer or a copolymer and may be a polyether, polythioether, a copolymer thereof or may be a different type of polymer, e.g. a polyurethane which may contain ether or thioether linkages. The polymer may for example comprise a homo- or copolymer of an alkylene oxide, e.g. poly (propylene oxide), poly (ethylene oxide), poly (tetramethylene oxide), of a vinylether, of phenylene oxide, styrene oxide, of formaldehyde, of epichlorohydrin, e.g. bisphenol A-epichlorohydrin copolymer, a polyurethane containing one or more blocks of a poly (alkylene oxide) polymer or any of the above polymers in which ethereal oxygen is wholly or partly substituted by sulphur.

The metallic compound which is normally a salt, i.e. exists in ionic form, is preferably a compound of one of the metals Z, Co, Sn, Ni, Fe, Hg, Zr, Al, Mg, Cu or Ag and it is, in general, desirable that the metal is present in an atmospherically stable oxidation state. Salts may comprise a wide range of anions, of which the following are preferred:- $F^-$, $Cl^-$, $Br^-$, $I^-$, $NO_3^-$, $CNS^-$, $NCS^-$, $SO_4^{2-}$, $ClO_3^-$, $ClO_4^-$, $CO_3^{2-}$, phosphates, acetate and other organic anions. The concentration of the metallic compound in the polymer is usually at least 2 mole % of the total ether, thioether or urethane linkages by virtue of which the solid solution is formed, and normally does not exceed 30 mole % though it may reach 50 mole %.

The molecular weight of the polymer from which the solid solution is prepared is dependent on the application which the solid solution finds. High polymers with molecular weight greater than 20,000 are of interest for incorporation in electrets useful for example in piezoelectric transducers, capacitors and charge storage devices whereas low polymers with molecular weight less than 20,000 are of interest as solid electrolytes and semiconductors.

The solid solutions of the present invention may be prepared by removing solvent from a solution of the polymer and the metallic compound in the solvent at a rate such that the product is predominantly, or preferably wholly, single phase. Should the rate of removal be too great, or the temperature of the solution at which solvent is removed not be properly chosen, precipitation or unreacted metallic compound or polymer is liable to result. In practice, the compound and polymer are generally dissolved separately in the chosen solvent, which may comprise a plurality of solvent components, typically maintained at a temperature above ambient in order to promote dissolution, and the solutions are then mixed. The mixture is then usually held at a temperature above ambient, typically 100° C. or less and the bulk of the solvent is evaporated therefrom for example by passage of a stream of gas such as nitrogen over the surface of the solution. Residual solvent may be removed under vacuum if necessary at elevated temperature. In general the solvent for the mixture of metallic compound in the polymer comprises polar organic compounds such as the alcohols, tetrahydrofuran or acetone and may also comprise a less polar cosolvent, such as toluene. In particular, solid solutions of cobalt halides e.g. $CoCl_2$ in high molecular weight polyalkylene oxides such as polypropylene oxide may require a carefully chosen mixture of a polar solvent and less polar cosolvent, for example an alcohol such as ethanol and a hydrocarbon such as toluene. About 30% toluene in ethanol is preferred.

It is usually highly desirable to ensure that the mixture in the solvent is kept anhydrous by for example ensuring that any gas stream employed for evaporation is dry.

Each of the materials according to the present invention are of interest for one or more of the following applications:-a. as a dielectric in a capacitor, b. as a solid electrolyte in a cell. c. as an electret or d. as a dielectric absorber. The suitability of a material for particular application is dependent on the nature of the metallic compound and of the polymer and on the concentration of the compound in the polymer.

a. As a dielectric in a capacitor: it will be appreciated that a capacitor comprises two conducting elements, e.g. metal foils, between which are sandwiched an insulating dielectric. A large contact area may be obtained by combining a plurality of conducting and dielectric elements in alternating sequence, e.g. by arranging metals foils and dielectric elements in a stack or in a roll. High electrical capacitance of the device (i.e. ability thereof to store electrical charge) is obtained by providing an insulating dielectric of high dielectric constant. The dielectric is usually in thin film form and able to withstand high electric voltages applied across the thickness thereof.

The present materials when at the optimum composition and temperature ranges are capable of giving improvements of more than 100 fold in capacitance over existing capacitors filled with thermoplastic materials. Materials which have a high dielectric constant, e.g. at least 1000 at low and radio frequencies, at temperature above their Tg can accept very large electrical charges which, on cooling below the Tg, are stored in the polymeric material, being releasable on reheating. Materials containing zinc or tin salts in polymers such as poly (propylene oxide) are of particular interest for this application.

b. As a solid electrolyte in a cell: a cell comprises electrodes of different chemical potential in contact with a common electrolyte. A liquid electrolyte is usually employed but may be replaced by a material according to the present invention in solid form provided that ions of metals used as the electrodes are soluble in the material in the presence of a common anion. By using metal foil electrodes and thin films of the present materials as solid electrolytes very high surface areas can be achieved to give normal current densities. Such systems are lightweight and non-spillable. Salt concentrations in the polymer between 10% and 50% by weight are preferred for solid electrolyte applications, the following salts being of particular interest:-$Mg Cl_2$, $Zn Cl_2$, $Sn Cl_2$, $Fe Cl_3$, $Cu Cl_2$, $Mg Cl_2$ and $Co Cl_2$. Polyethers such as poly(ethylene oxide) are generally preferred as polymers.

c. As an electret: it will be appreciated that an electret is a material (usually in film or plate form) which can maintain an electric polarization in the absence of an external field. In the present materials, when of suitable composition, this may be achieved by polarizing the film at high temperature and cooling to below the glass transition temperature (Tg), with the field still applied. If Tg is sufficiently greater than room temperature a permanent electret can be produced.

Electret films can be used in conjunction with an adjacent counter electrode as a piezoelectric transducer e.g. a condenser type microphone or a loudspeaker. In the former case impinging sound waves cause movement of the electret film towards and away from the counter electrode with resulting potential changes therein. These voltage changes can be utilized in conventional ways, e.g. in telephones and tape recording systems. Zinc salts and in particular zinc bromide especially in polyethers such as polypropylene oxide, are of special interest for this application.

d. As a dielectric absorber: materials according to the present invention may be employed as absorbers of (i) radio frequency and low micro waves frequency radiation or (ii) high micro wave frequency radiation. In case (i) the materials find application for example as seals for use with microwave ovens and in welding operations which use radio frequency heating. Materials with high dielectric loss at or above room temperature may act as good dielectric heating materials for use in the dielectric welding of plastic components one to another. Materials of particular interest for this application include polyethers and polyurethanes containing salts of certain of the metals hereinbefore disclosed and in particular salts of Fe, Co, Cu, Zn and Sn. In case (ii) the materials find application in anechoic test chambers and as coatings for objects located near radar transmitters, which coatings minimise reflection from the objects. Examples of such objects are:-ship's masts and airport structures. In effective materials the ratio of dielectric constant/magnetic permittivity approaches unity and the dielectric loss is preferably high. It is envisaged that these requirements can be met by selection of metal for the metallic compound with optimum paramagnetism, salts of iron cobalt and nickel being of particular interest, especially when dispersed in polyethers.

The present invention is illustrated by the following Examples.

Example 1

Poly (propylene oxide)-zinc chloride

Purification of Poly (propylene oxide)

High molecular weight, amorphous poly (propylene oxide), containing 5% co-units of allyglycidylether (Parel 58, $\overline{M}_n = 3.5 \times 10^5$, Tg of $-64°$ C. supplied by Hercules Inc.) is purified in the following manner.

Parel 58 (50 g) is dissolved in acetone (1000 $cm^3$) (dried over 3Å molecular sieve) and centrifuged at 10000 rev/min for 1 hour. This treatment removes traces of insoluble initiator. The polymer solution is then slowly poured, with stirring, into a large volume of distilled water. The polymer is precipitated from solution and the wet polymer is dried under vacuum at 60° C. After drying, the polymer is dissolved in dry A.R. benzene (800 ml) (dried over 3Å molecular sieve) and the solution is frozen using liquid nitrogen or solid $CO_2$. The frozen solution is placed in a vacuum desiccator at room temperature and the benzene is removed by pumping for 7 days. The resultant purified polymer (45 g) contains no water and is completely amorphous, as evidenced respectively by infrared analysis and wide angle X-ray scattering.

Preparation of Solid Solution

Purified poly (propylene oxide) (5.01 g) is dissolved in A.R. methanol (50 ml) (dried over 3Å molecular sieve).

Anhydrous zinc chloride (1.02 g, supplied by BDH Chemicals Ltd), dried for several weeks under vacuum, is also dissolved in A.R. methanol (50ml, dried over 3Å molecular sieve) and the resultant solution is filtered under dry nitrogen to remove very small traces of zinc oxide ($\sim$0.01 g). The solutions of poly (propylene oxide) and zinc chloride are added together and thoroughly mixed for several hours. The solution is then poured into a circular polytetrafluoroethylene mould and the bulk of the methanol removed by blowing a stream of dry nitrogen over the solution at 50° C. for 48 hours. Last traces of methanol are removed under vacuum initially at 50° C. for 24 hours, and then at 100° C. for several days. The resulting solid solution of zinc chloride (8.72 mole % with respect to moles of poly (propylene oxide) monomer) in poly (propylene oxide) is stored under vacuum at room temperature.

EXAMPLES 2-4

The procedure described in Example 1 is repeated, but the amount of zinc chloride used is altered so as to yield solid solutions containing respectively: 1.09, 13.3 and 27.1 mole % zinc chloride in poly (propylene oxide).

Measurement of Electrical Properties and of the Glass Transition Temperature

The glass transition temperature (Tg) is determined using a DuPont 900 Differential Thermal Analyser, equipped with the Differential Scanning Calorimetry Accessory. Samples ($\sim$5-10 mg) are scanned from $-100$ to 100° C. at a heating rate of 15° C./min using mercury as a reference standard.

For dielectric and electret analysis the solid solutions are compression moulded into 5 cm diameter circular discs, approximately 1.0 mm thick.

Dielectric measurements are made in the frequency range 120–$10^5$ Hz and in the temperature range $-150$ to $+100°$ C. using a three-terminal cell (wayne Kerr "Solid Dielectric Permittivity" Jig D321) under vacuum. The cell is sealed in a copper container and the temperature is monitored by a thermocouple adjacent to the sample. The measuring bridge used in the temperature range $-150$ to 20° C. is a Rohde and Schwarz "Dielectric Test Bridge" Type VKB BN 3520 with a VKB Extension Unit BN 35208 where required. The cell is cooled from room temperature to $-78°$ C. using solid carbon dioxide-methanol solutions, and below −78° C. by liquid nitrogen passing through a copper coil surrounding the cell. Temperature control is achieved to within 0.5° C.

The measuring bridge in the temperature range 20 to 100° C. is a Wayne-Kerr Universal Bridge B221. The three-electrode cell, still sealed in its copper canister, is immersed in an oil bath thermostatted to ±0.1° C.

To ensure good electrical contact between the sample surface and the electrodes, tin foil is attached to the specimen with a thin film of silicone grease. Results with gold-plated samples are not significantly different.

At a given temperature, readings of dielectric constant and dielectric loss are obtained as a function of frequency by balancing the bridge. These readings are repeated at 5° C. temperature intervals throughout the entire temperature range.

Solid solutions for electret thermal analysis are poled at a temperature above Tg using a field strength of 2000 volts/cm. The sample is then cooled to −100° C. using liquid nitrogen with the field still applied. At −100° C. the field is removed and the thermally stimulated discharge current is measured using an electrometer (Keighley Model 615 Digital Electrometer) as the sample is heated at 5° C./min to 100° C.

Results

The solid solution produced as described in Example 2, containing 1.09 mole % $ZnCl_2$ has a Tg of −62° C. and a dielectric loss of 350 at 200 Hz and 50° C. Because of the high value for the dielectric loss the material is of interest in application where dielectric absorption is required.

The solid solution produced as described in Example 3, containing 13.3 mole % $ZnCl_2$ has a Tg of −42° C. and a dielectric constant of 250 at 200 Hz and 50° C. Because of the high value for the dielectric constant the material is of interest as a dielectric in capacitors.

The solid solution produced as described in Example 4, containing 27.1 mole % $ZnCl_2$ has a Tg of 33° C. and is of interest as an electret. The material may be poled at field strengths of ∼$10^4$ volts/cm and, due to the very large dielectric constant, is capable of storing very high charge densities for several days.

It will be appreciated that the physical properties of the above solid solutions depend upon the mole % of zinc chloride present. An increase in the mole % of zinc chloride present results in an increase in the glass transition temperature (Tg), although all the materials are thermoplastic, a low mole % of zinc chloride gives a rubbery material, whereas a high mole % of zinc chloride gives a glass at room temperature. Materials of intermediate composition are tough and leathery.

It will be seen from the Results that solid solutions of zinc chloride in poly (propylene oxide) are of interest as dielectrics in capacitors, dielectric absorbers, and as electrets. The application to which they are best suited depends upon the amount of zinc chloride present.

EXAMPLE 5

Poly (propylene oxide)-zinc bromide

Poly (propylene oxide) (1.80 g), purified as described in Example 1, is dissolved in A.R. methanol (50 ml, dried over 3Å molecular sieve). Anhydrous zinc bromide (1.58 g, supplied by BDH Chemicals Ltd), dried under vacuum for several weeks, is also dissolved in A.R. methanol (50 ml, dried over 3Å molecular sieve). These solutions are thoroughly mixed and the solvent removed in a manner analogous to the poly (propylene oxide)-zinc chloride solid solutions.

The resulting solid solution contains 20.0 mole % zinc bromide in poly (propylene oxide) and is a clear, colourless glass at room temperature with a Tg of 45° C. The material has a dielectric constant of 30 at 200 Hz and 60° C., (65 at 200 Hz and 80° C.) as measured by the techniques described previously. This solid solution is of interest for use in electrets since it is capable of maintaining high charge densities for up to 10 weeks at room temperature.

EXAMPLE 6

Poly (propylene oxide)-zinc iodide

The procedure of Example 5 is repeated using poly (propylene oxide) (5.0 g) in A.R. methanol (100 ml) and Zinc iodide (4.4 g) in A.R. Mehanol (100 ml).

The resulting solid solution contains 15 mole % zinc iodide in poly (propylene oxide) and has a Tg of −2° C. and dielectric constant of 25 at 200 Hz and 80° C.

EXAMPLE 7

Poly (propylene glycol)-cobalt (II) chloride

Amorphous, low molecular weight poly (propylene glycol) (Trade name PPG 2000, $\overline{M}n$=2000, Tg=−64° C., supplied by Shell Limited) is degassed at 50° C. under vacuum and requires no subsequent purification. This is then used to prepare solid solutions with metal salts.

Poly (propylene glycol) (5.0 g) is dissolved is absolute ethanol (50 ml, azeotroped with benzene and dried over 3Å molecular sieve). Anhydrous cobalt (II) chloride (2.50 g, supplied by BDH Chemicals Ltd) is dissolved in similarly purified absolute ethanol (50 ml) and the two solutions are thoroughly mixed together. The solvent is then removed in the manner described previously to leave a solid solution of 18.3 mole % $Co(II)Cl_2$ in poly (propylene glycol). This material is a dark blue, transparent, brittle glass at room temperature and may be compression moulded at elevated temperatures. Tg of this material is 38° C.

EXAMPLE 8

Poly (propylene glycol)-ferric chloride

The procedure of Example 7 is repeated using poly (propylene glycol) (1.5 g) in absolute ethanol (50 ml) and ferric chloride (1.4 g) in absolute ethanol (50 ml).

The resulting material is a brown transparent brittle glass at room temperature with Tg of 22° C. and may be compression moulded at elevated temperatures.

EXAMPLE 9

Poly (propylene glycol)-mercury (II) chloride

A solid solution of 17.5 mole % Hg (II) $Cl_2$ in poly (propylene glycol) is prepared by thoroughly mixing solutions of anhydrous mercuric chloride (1.00 g in 50 ml ethanol) and poly (propylene glycol), (1.01 g in 50 ml ethanol). The method of preparation is analogous to the preparation of the poly (propylene glycol)- cobalt (II) chloride solid solution. The mercuric chloride solid solution is a colourless transparent, extremely viscous liquid at room temperature with a Tg of −13° C.

EXAMPLE 10

Poly (propylene glycol)-stannous chloride

The procedure of Example 9 is repeated using poly (propylene glycol) (1.4 g) in A.R. methanol (50 ml) and Stannous Chloride (1.4 g) in A.R. methanol (50 ml).

The resultant solid solution of 22.2 mole % Stannous Chloride in poly (propylene glycol) in a colourless, transparent, extremely viscous liquid at room temperature with Tg of −5° C.

EXAMPLE 11

Poly (ethylene oxide)-copper (II) chloride

Poly (ethylene oxide) (Trade name Polyox WSRN −10, $\overline{M}n=100,000$, Tg=−75° C., supplied by Union Carbide) and anhydrous copper (II) chloride (BDH Chemicals Ltd) are dried under vacuum for several days.

Poly (ethylene oxide) (1.0 g) and anhydrous copper (II) chloride (1.018 g) are then separately dissolved in A.R. methanol (dried over 3Å molecular sieve). These solutions are thoroughly mixed together and the solvent removed as described previously. The resultant, green, solid solution contains 25.0 mole % of copper (II) chloride in poly (ethylene oxide) and has a Tg of −10° C.

A thin film of this material is pressed between copper and zinc electrodes and a direct current voltage of 5 volts applied between them for 1 hour. After this period the applied potential is removed and the potential difference between the copper and zinc electrodes is measured. A potential difference of ~1.1 volts is present for a long period and the material is of interest as a solid electrolyte in battery application where low current densities are permissible.

EXAMPLE 12

Polyurethane-zinc chloride

A polyurethane is prepared using conventional polymer techniques from poly (propylene glycol) (10 g), hexamethylene diisocyanate (3.7 g) and butanediol (1.08 g). The resultant polyurethane (Tg −69° C.) is dissolved in dry absolute ethanol, and a solution of anhydrous zinc chloride in ethanol is added with thorough mixing. The solvent is removed as previously described to give a solid solution of 16.6 mole % zinc chloride in polyurethane. This material is a rubbery elastomer at room temperature with a Tg of −30° C.

We claim:

1. A polymeric material which comprises an amorphous solid solution formed between a metallic salt and a polymer by virtue of a multiplicity of thioether linkages present in the backbone of said polymer or in pendant groups of said polymer or both, the metal of the metallic salt being selected from the group consisting of Be, Mg, Sr, Ba, Sc, Y, Ti, V, Cr, Mn, Fe, Co, Ni, Zn, Ga, Ge, Zr, Nb, Mo, Tc, Ru, Rh, Pd, Ag, Cd, In, Sn, Sb, Hf, Ta, W, Re, Os, Ir, Pt, Au, Hg, Tl, Pb, Bi, Al, La and other lanthanides.

2. A polymeric material according to claim 1, in which, when the metal of the metallic salt is zinc, the non-metallic moiety of the metallic salt is other than chlorine.

3. A polymeric material according to claim 1, in which the polymer comprises at least 5 mole % thioether linkages.

4. A polymeric material according to claim 1, in which the polymer comprises no more than 50 mole % thioether linkages.

5. A polymeric material according to claim 1, in which the polymer is a polythioether, and a copolymer of a polyether and a polythioether.

6. A polymeric material according to claim 1, in which the polymer is a homopolymer or copolymer of: a sulfide analogue of an alkylene oxide, a vinylether, phenylene oxide, styrene oxide, formaldehyde or epichlorohydrin.

7. A polymeric material according to claim 1, in which the metal in the metallic salt is Zn, Co, Sn, Ni, Fe, Hg, Zr, Al, Mg, or Ag.

8. A polymeric material according to claim 1, in which the metallic salt comprises an anion selected from the group consisting of $F^-$, $Cl^-$, $Br^-$, $I^-$, $No_3^-$, $CNS^-$, $NCS^-$, $SO^-$, $ClO_3^-$, $ClO_4^-$, $CO^-$, phosphates, acetate or other organic anion.

9. A polymeric material according to claim 8, in which the anion is other than $I^-$, $ClO_3^-$, or a phosphate.

10. A polymeric material according to claim 1, in which the metallic salt is zinc bromide.

11. A polymeric material according to claim 10, in which the metallic salt is zinc bromide and the polymer is poly (propylene sulfide).

12. A polymeric material according to claim 1, in which the concentration of the metallic salt in the polymer is at least 2 mole % of the total thioether linkages.

13. A polymeric material according to claim 1, in which the concentration of the metallic salt in the polymeric material is no greater than 50 mole % of the total thioether linkages.

14. An electret film comprising a polymeric material according to claim 1.

15. A dielectric absorber comprising a polymeric material according to claim 1.

16. A microwave oven seal comprising a material according to claim 1.

17. A dielectric welding material comprising a material according to claim 1.

18. A process for the production of an amorphous solid solution formed between a metallic salt and a polymer, by virtue of a plurality of thioether linkages which are present in the backbone of said polymer or in pendant groups of said polymer or in both, which comprises:

preparing a solution of a polymer and a metallic salt in a solvent, wherein the metal of said metallic salt is in its atmospherically stable oxidation state and is selected from the group consisting of Be, Mg, Sr, Ba, Sc, Y, Ti, V, Cr, Mn, Fe, Co, Ni, Zn, Ga, Ge, Zr, Nb, Mo, Tc, Ru, Rh, Pd, Ag, Cd, In, Sn, Sb, Hf, Ta, W, Re, Os, Ir, Pt, Au, Hg, Tl, Pb, Bi, Al, La and other lanthanides;

removing the solvent from said solution at a rate such that the resulting polymeric product remains predominantly in a single phase; and recovering an amorphous solid solution of said metallic salt in said polymer.

19. The process of claim 18, wherein the removal of said solvent is carried out at a temperature of about 100° C. or less.

20. The process of claim 18, wherein said solvent is removed by passage of a stream of gas over the surface of said solution.

21. The process of claim 18, wherein said solvent is a mixture of a polar solvent and a less polar cosolvent.

22. The amorphous solid solution prepared by the process of claim 18.

* * * * *